(12) United States Patent
Takeuchi

(10) Patent No.: US 8,542,416 B2  
(45) Date of Patent: Sep. 24, 2013

(54) IMAGE PROCESSING APPARATUS

(75) Inventor: Masaru Takeuchi, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 546 days.

(21) Appl. No.: 12/732,179

(22) Filed: Mar. 25, 2010

(65) Prior Publication Data

US 2010/0245948 A1  Sep. 30, 2010

(30) Foreign Application Priority Data

Mar. 31, 2009 (JP) ................................ 2009-088314

(51) Int. Cl.
- G06K 15/00 (2006.01)
- H04N 1/04 (2006.01)
- B65H 5/22 (2006.01)

(52) U.S. Cl.
USPC ........ 358/498; 358/1.12; 271/3.01; 271/3.14; 271/3.17

(58) Field of Classification Search
USPC .............. 358/448, 498; 271/3.01, 3.14, 3.17, 271/8.1
See application file for complete search history.

(56) References Cited

U.S. PATENT DOCUMENTS

| | | | |
|---|---|---|---|
| 5,579,099 A | 11/1996 | Nishiyama et al. | |
| 6,011,936 A | 1/2000 | Kaneko | |
| 6,473,590 B2 * | 10/2002 | Matsumoto et al. | 399/404 |
| 7,604,228 B2 | 10/2009 | Ohama et al. | |
| 2002/0098023 A1 | 7/2002 | Mitomi | |
| 2004/0004319 A1 | 1/2004 | Hattori et al. | |
| 2004/0217537 A1 | 11/2004 | Ohama | |
| 2005/0094226 A1 | 5/2005 | Burch | |
| 2006/0082051 A1 * | 4/2006 | Taguchi et al. | 271/264 |
| 2007/0052149 A1 | 3/2007 | Matsushima | |
| 2007/0052164 A1 | 3/2007 | Watase et al. | |
| 2007/0063430 A1 | 3/2007 | Sakakibara et al. | |
| 2009/0027738 A1 | 1/2009 | Kim | |

(Continued)

FOREIGN PATENT DOCUMENTS

| | | |
|---|---|---|
| CN | 1667519 A | 9/2005 |
| CN | 1944208 A | 4/2007 |

(Continued)

OTHER PUBLICATIONS

Japan Patent Office, Notice of Reasons for Rejection for Japanese Patent Application No. 2009-088314 (counterpart to above-captioned patent application), mailed Mar. 22, 2011.

(Continued)

*Primary Examiner* — Jerome Grant, II  
(74) *Attorney, Agent, or Firm* — Baker Botts L.L.P.

(57) ABSTRACT

An image processing apparatus includes a first conveying path, a curved conveying path, a second conveying path, an upper cover, a first image reading section, a third conveying roller, a second conveying roller, a second image reading section, a first conveying roller, a fourth conveying roller and a control unit. The control unit controls to stop conveying the sheet when a back edge of the sheet passes the first conveying roller in the case where a length of the sheet is less than a first distance between the first conveying roller and the third conveying roller, and controls to stop conveying the sheet after conveying the sheet until the back edge passes the third conveying roller in the case where the length of the sheet is greater than the first distance and is less than a second distance between the third conveying roller and the fourth conveying roller.

4 Claims, 13 Drawing Sheets

(56) References Cited

U.S. PATENT DOCUMENTS

| | | | |
|---|---|---|---|
| 2009/0027745 A1 | 1/2009 | Kweon | |
| 2009/0127775 A1* | 5/2009 | Takahashi et al. | 271/225 |
| 2009/0255971 A1* | 10/2009 | Nakamaki et al. | 226/1 |
| 2009/0323131 A1* | 12/2009 | Toyoda | 358/448 |
| 2010/0245946 A1 | 9/2010 | Takeuchi et al. | |
| 2010/0245947 A1 | 9/2010 | Takeuchi et al. | |

FOREIGN PATENT DOCUMENTS

| | | |
|---|---|---|
| JP | H05191593 A | 7/1993 |
| JP | H06-343123 A | 12/1994 |
| JP | H07-193680 A | 7/1995 |
| JP | H07-209927 A | 8/1995 |
| JP | H09-046472 A | 2/1997 |
| JP | H09-048539 A | 2/1997 |
| JP | H10-302993 A | 11/1998 |
| JP | H10-330007 A | 12/1998 |
| JP | H11-069087 A | 3/1999 |
| JP | 2000-041133 A | 2/2000 |
| JP | 2001-265070 A | 9/2001 |
| JP | 2002-152462 A | 5/2002 |
| JP | 2002-344691 A | 11/2002 |
| JP | 2002-359725 A | 12/2002 |
| JP | 2003-032406 A | 1/2003 |
| JP | 2003-076074 A | 3/2003 |
| JP | 2004-007239 A | 1/2004 |
| JP | 2004-043178 A | 2/2004 |
| JP | 2004-136999 A | 5/2004 |
| JP | 2004-154981 A | 6/2004 |
| JP | 2004-242173 A | 8/2004 |
| JP | 2004-277144 A | 10/2004 |
| JP | 2004-336275 A | 11/2004 |
| JP | 2005-094473 A | 4/2005 |
| JP | 2005-136985 A | 5/2005 |
| JP | 2007-049414 A | 2/2007 |
| JP | 2007-070033 A | 3/2007 |
| JP | 2007-082095 A | 3/2007 |
| JP | 2008-124582 A | 5/2008 |
| JP | 2008-187595 A | 8/2008 |
| JP | 2009-035357 A | 2/2009 |
| KR | 2004013444 A | 2/2004 |

OTHER PUBLICATIONS

Japan Patent Office, Notice of Reasons for Rejection for Japanese Patent Application No. 2010-063985 (counterpart Japanese patent application), mailed Jun. 12, 2012.

Japan Patent Office, Notice of Reasons for Rejection for Japanese Patent Application No. 2010-063986 (counterpart Japanese patent application), mailed Jun. 19, 2012.

The State Intellectual Property Office of the People's Republic of China, Notification of First Office Action for Chinese Patent Application No. 201010144251.9 (counterpart Chinese patent application), issued Mar. 1, 2012.

The State Intellectual Property Office of the People's Republic of China, Notification of First Office Action for Chinese Patent Application No. 201010144697.1, issued Dec. 13, 2011.

The State Intellectual Property Office of the People's Republic of China, Notification of the Second Office Action for Chinese Patent Application No. 201010144697.1, issued Sep. 7, 2012.

Japan Patent Office, Notice of Reasons for Rejection for Japanese Patent Application No. 2009-088314, mailed Nov. 8, 2011.

United States Patent and Trademark Office, Office Action for U.S. Appl. No. 12/731,904 (related U.S. patent application), mailed Dec. 31, 2012.

United States Patent and Trademark Office, Office Action for U.S. Appl. No. 12/731,792 (related U.S. patent application), mailed Dec. 31, 2012.

Japan Patent Office, Notice of Reasons for Rejection for Japanese Patent Application No. 2010-063985 (counterpart Japanese patent application), mailed Feb. 12, 2013.

Japan Patent Office, Notice of Reasons for Rejection for Japanese Patent Application No. 2010-063986 (counterpart Japanese patent application), mailed Feb. 12, 2013.

* cited by examiner

IMAGE PROCESSING APPARATUS

CROSS REFERENCE TO RELATED APPLICATION

The present application claims priority from Japanese Patent Application No. 2009-088314, which was filed on Mar. 31, 2009, the disclosure of which is incorporated herein by reference in its entirety.

BACKGROUND OF THE INVENTION

1. Field of the Invention

The present invention relates to an image processing apparatus that reads an image recorded on both front and back surfaces of a sheet conveyed by a plurality of rollers. In particular, the present invention relates to controlling sheet conveyance.

2. Description of the Related Art

Conventionally, an image processing apparatus comprising a U-turn conveying path and two image reading portions is known. In such an image processing apparatus, an image of one of the front and back surfaces of the sheet is read by one image reading portion first, and after the front and back surfaces of the sheet is reversed, an image of another of the front and back surfaces of the sheet is read by another image reading portion.

SUMMARY OF THE INVENTION

In such an image processing apparatus comprising such a U-turn conveying path, since a plurality of rotary shafts are disposed in the U-turn conveying path, when the length of the sheet in the conveying direction is shorter than a span between the conveying rollers, the sheet stops in the span between the conveying rollers without being nipped by the conveying rollers. Furthermore, when a problem occurs in reading out an image while the conveying rollers nip the sheet, it is difficult to take out the sheet, and the conveying rollers may be damaged or the sheet itself may be damaged as a result of forcefully pulling out the sheet.

A need has arisen to provide an image processing apparatus that can quickly perform a jamming prevention operation without damage to the sheet.

In an embodiment of the invention, an image processing apparatus capable of reading an image recorded on a first surface and a second surface of a sheet comprises a U-turn conveying path comprising a first conveying path formed in a substantially plate shape, a second conveying path disposed below the first conveying path and a curved conveying path disposed between the first conveying path and the second conveying path, an upper cover configured to rotate between a closed position where the first conveying path is partly covered and an open position where the first conveying path is exposed, wherein at least the first conveying path is exposed when the upper cover is in the open position, a first image reading section disposed below the first conveying path and configured to read the image recorded on the first surface of the sheet conveyed along the first conveying path, a second image reading section disposed below the second conveying path and configured to read the image recorded on the second surface of the sheet conveyed along the second conveying path, a first conveying roller positioned upstream of the first conveying path in a conveying direction and configured to nip and convey the sheet to the first conveying path, a second conveying roller positioned at a boundary between the first conveying path and the curved conveying path and configured to nip and conveyed the sheet to the curved conveying path, wherein the second conveying roller unnips the sheet when the upper cover is in the open position, a third conveying roller positioned downstream of the curved conveying path in the conveying direction and configured to nip and convey the sheet to the second conveying roller, a fourth conveying roller positioned downstream of the second conveying path in the conveying direction and configured to discharge the sheet from the second conveying path, and a control unit that controls to stop conveying the sheet when a back edge of the sheet passes the first conveying roller in the case where a length of the sheet in the conveying direction is less than a first distance between the first conveying roller and the third conveying roller along the conveying direction and to stop conveying the sheet after conveying the sheet in the conveying direction until the back edge of the sheet passes the third conveying roller in the case where the length of the sheet in the conveying direction is greater than the first distance and is less than a second distance between the third conveying roller and the fourth conveying roller along the conveying direction.

According to the present invention, when a jamming prevention operation is required due to the length of a sheet, the driving of each conveying roller is stopped in a short time in correspondence with the length of the sheet. Therefore, the sheet is quickly removed from the U-turn path, as a result of which an image processing apparatus that contributes to saving electric power is realized.

Other objects, features, and advantages of embodiments of the present invention will be apparent to persons of ordinary skill in the art from the following description of preferred embodiments with reference to the accompanying drawings.

DESCRIPTION OF THE PREFERRED EMBODIMENTS

The present invention will hereunder be described in detail on the basis of preferred embodiments with reference to the drawings as required.

[General Structure of Image Processing Apparatus]

Figure 1:
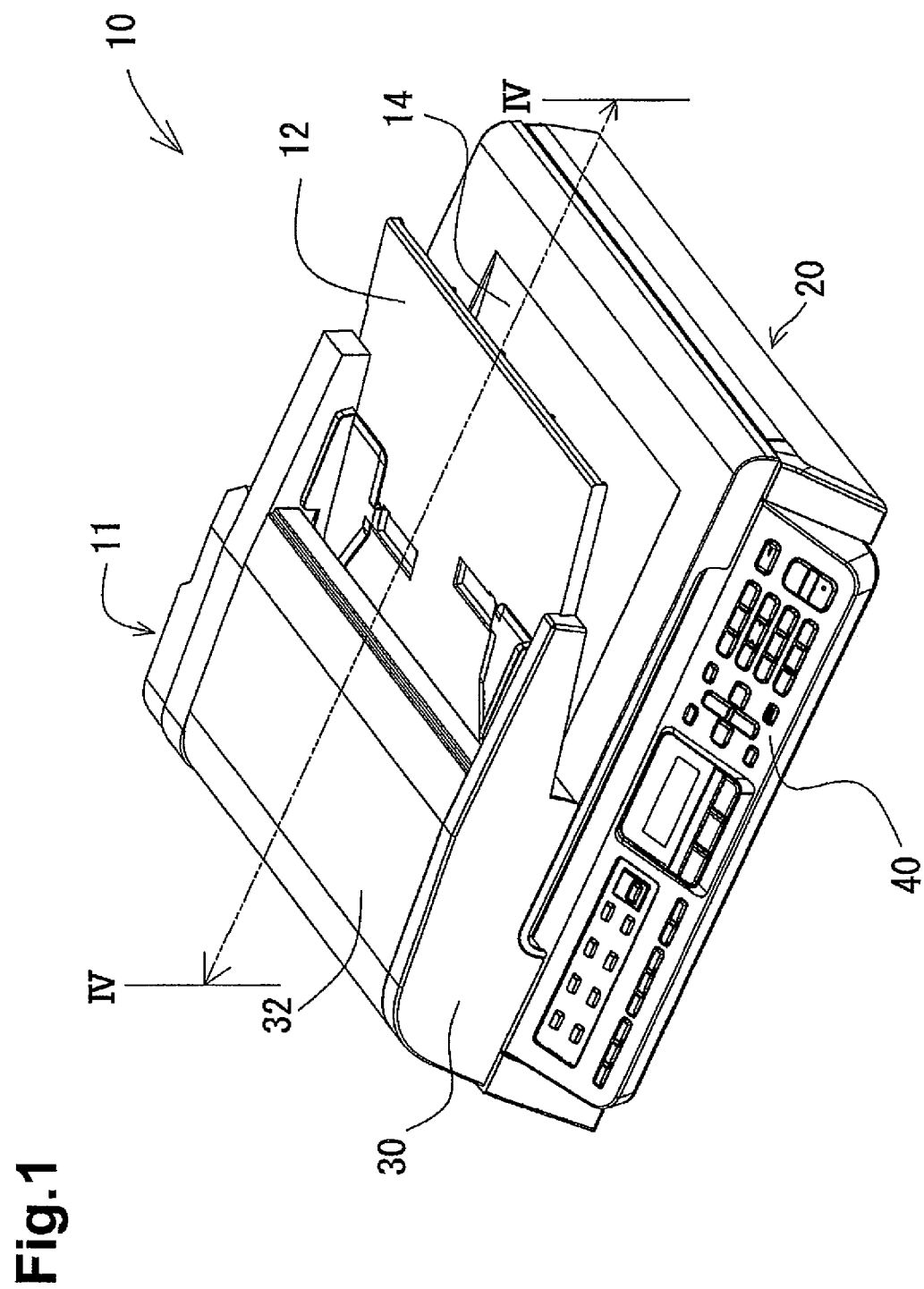
FIG. 1 is a perspective view of an image processing apparatus according to an embodiment of the present invention.

FIG. 1 is a perspective view of an image processing apparatus 10 according to an embodiment of the present invention.

The image processing apparatus 10 includes an image reading device 20, an automatic document feeder (ADF) 11 disposed at the upper portion of the image reading device 20, and an operation panel 40 provided at the front side of the image reading device 20. The ADF 11 is rotatably provided with respect to the image reading device 20. Therefore, the ADF 11 can be used to open and close the upper side of the image reading device 20 (see FIG. 2). When a user perform a reading operation without using the ADF 11, the user opens the ADF 11 and place original sheets on a predetermined position on an after-mentioned moving reading glass 80. Then, the user closes the ADF 11 and operates the operation panel 40, and thereby can read an image of an original sheet placed on the moving reading glass 80.

Figure 2:
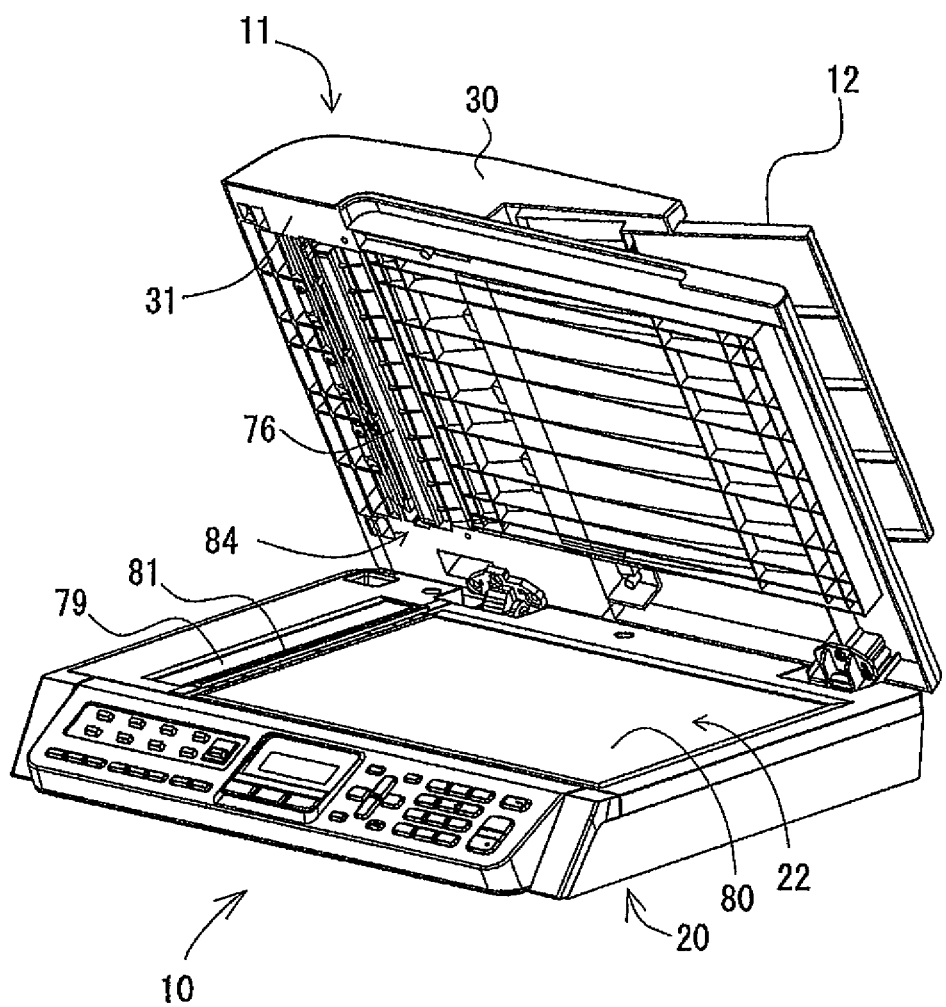
FIG. 2 is a perspective view of the image processing apparatus according to the embodiment of the present invention.
Figure 3:
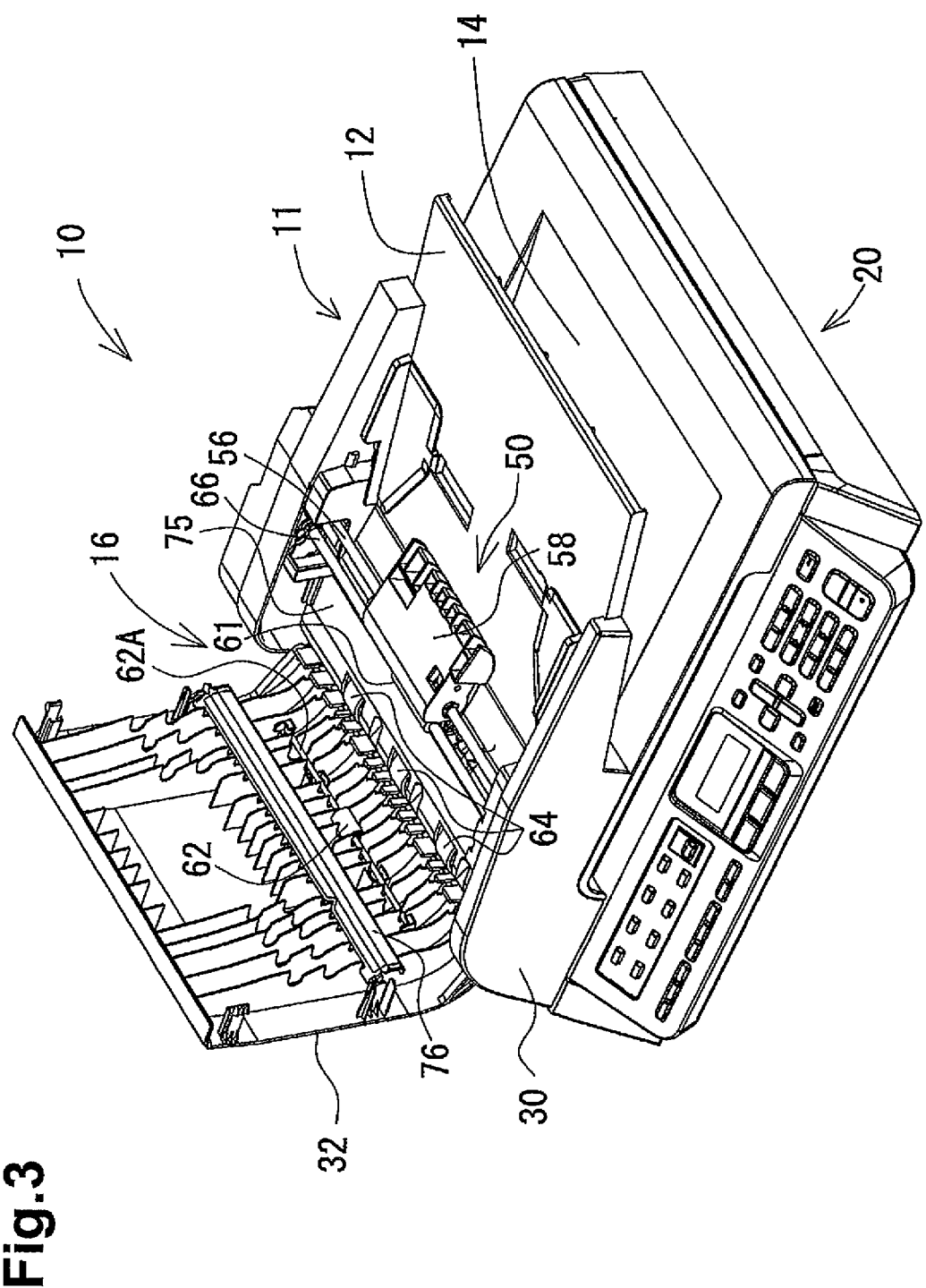
FIG. 3 is a perspective view of the image processing apparatus according to the embodiment of the present invention.
Figure 4:
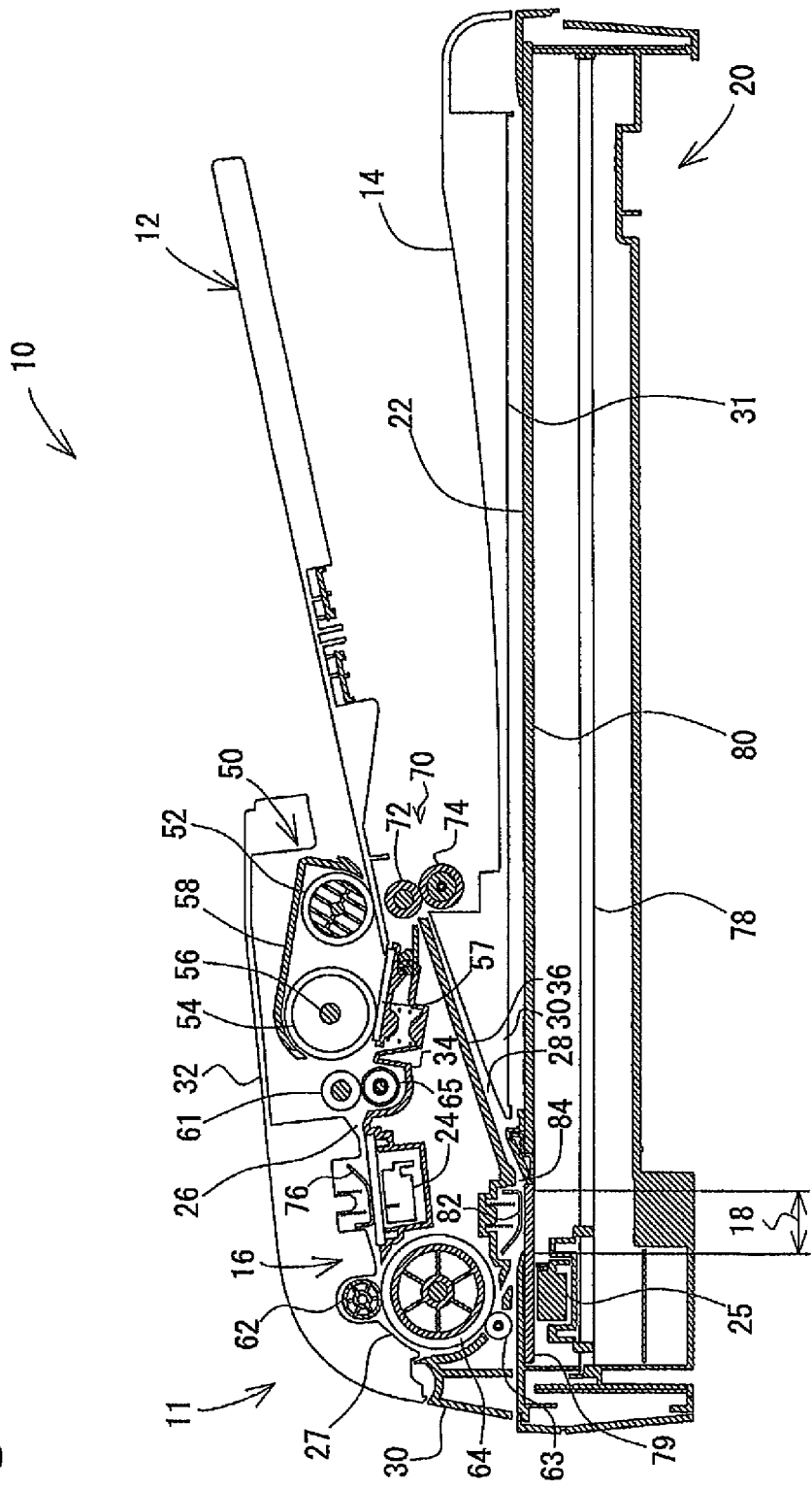
FIG. 4 is a sectional view taken along line IV-IV in FIG. 1.

FIG. 2 is a perspective view of the image processing apparatus 10 in a state in which the ADF 11 is open with respect to the image reading device 20. Actually, a white original pressing plate is disposed on a surface opposing almost whole surface of the moving reading glass 80 of a lower surface 31 of a body frame 30 of the ADF 11, but the original pressing plate is omitted in FIG. 2. FIG. 3 is a perspective view of the image processing apparatus 10 in a state in which an upper cover 32 (an example of an upper cover according to the present invention) of the ADF 11 is open. FIG. 4 is a sectional view taken along line IV-IV in FIG. 1.

The ADF 11 is disposed so as to cover the upper side of the image reading device 20, and can change its position between a "closed position" shown in FIG. 1 and an "open position" shown in FIG. 2, as mentioned above. As shown in FIGS. 3 and 4, the ADF 11 includes an original tray 12 on which original sheets are placed, and a sheet-discharge tray 14 to which the original sheets are discharged. The original tray 12 and the sheet-discharge tray 14 are disposed vertically in two levels. More specifically, the original tray 12 is disposed above the sheet-discharge tray 14. In the embodiment, the sheet-discharge tray 14 has a recessed portion formed in the body frame 30 of the ADF 11.

The ADF 11 conveys an original sheet drawn out from the original tray 12 along a U-turn conveying path 16 (an example of a U-turn conveying path according to the present invention), and discharges the original sheet to the sheet-discharge tray 14. The original tray 12 can hold a plurality of original sheets in a stacked state. In a case that images are recorded on both a front surface and a back surface of the original sheet, the original sheets are held in the stacked state in order of a first page as an uppermost surface, a third page, a fifth page, and so on, that is, odd pages face upward. Even pages are back surfaces of the odd pages and face downward. The ADF 11 continuously takes out the original sheets held in the stacked state one at a time from the original tray 12. The original sheets taken out from the original tray 12 are oriented in a direction toward the sheet-discharge tray 14 along the U-turn conveying path 16 (that is, a conveying direction), and are automatically conveyed to the sheet-discharge tray 14. The ADF 11 also includes an image sensor 24. As shown in FIG. 4, when the original sheet is conveyed along the conveying path 16, the image sensor 24 reads an image recorded on a first surface (back surface) of the original sheet. For the image sensor 24, a contact image sensor (CIS) or a charged coupled device (CCD) can be typically used, but in this embodiment the image sensor 24 is a CIS. By using a CIS as the image sensor 24, the image sensor 24 can be downsized, and the ADF 11, eventually, the image processing apparatus 10 can be downsized.

The image reading device 20 includes a contact glass 22. The contact glass 22 is disposed at the upper surface of the image reading device 20. An image sensor 25 is provided below the contact glass 22. When conveying the original sheet along the U-turn conveying path 16, the image sensor 25 reads an image recorded on a second surface (front surface) of the original sheet. The image sensor 25 also can read the image on the original sheet placed on the moving reading glass 80 while moving along an after-mentioned slide shaft 78. For the image sensor 25, a CIS or a CCD is also typically used, but in this embodiment the image sensor 25 is also a CIS. The image reading device 20 may have any structure as long as the ADF 11 is applicable. But, by using a CIS as the image sensor 25, the image sensor 25 can be downsized, and the image reading device 20, eventually, the image processing apparatus 10 can be downsized.

The embodiment exemplifies the case in which the present invention is carried out by using the image reading device 20 and the ADF 11 applicable thereto. However, the present invention may be carried out by using a copier or a multi-function device (MFD) which is mounted on top of an image recording device that records an image by adhering an image recording material (such as toner or ink) to a recording sheet.

The operation panel 40 is provided for operating the image reading device 20 and the ADF 11, and includes various operation buttons and a liquid crystal display section. A user can execute operations or settings of various functions by operating the operation panel 40. For example, using the operation panel 40, the user can set, for example, resolution provided when reading an image. The operation panel 40 is connected to a controlling section 100 (described later) (see FIG. 9). The controlling section 100 controls, for example, the conveyance of an original sheet or the setting of the resolution on the basis of an instruction that is given from the operation panel 40.

[U-Turn Conveying Path]

Figure 6:
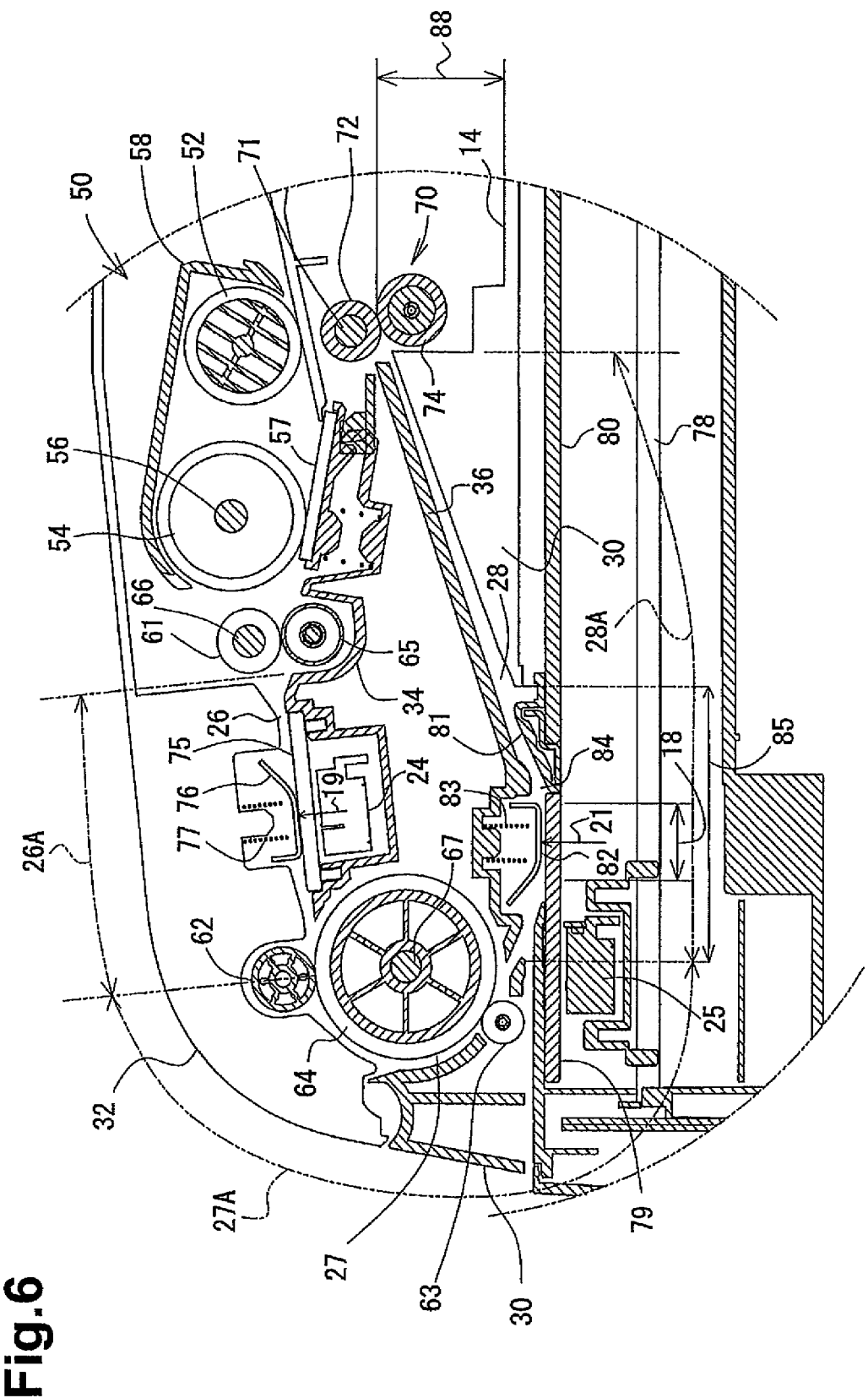
FIG. 6 is an enlarged view of the main portion in FIG. 4.

As shown in FIG. 4, the U-turn conveying path 16 includes a first conveying path 26 (an example of a first conveying path according to the present invention), a curved conveying path 27 (an example of a curved conveying path according to the present invention), and a second conveying path 28 (an example of a second conveying path according to the present invention). That is, the U-turn conveying path 16 is formed in a substantially U shape so that the original sheet placed on the original tray 12 is conveyed to the sheet-discharge tray 14. As shown in FIG. 4, the first conveying path 26 extends leftwards from the original tray 12. The original sheets to be conveyed are supplied to the first conveying path 26 by a sheet-feed unit 50, as mentioned later. In this embodiment, more specifically, as shown in FIG. 6, the first conveying path 26 is a conveying path from a left side of after-mentioned conveying roller 61 and pinch roller 65 to a nip point of after-mentioned main roller 64 and pinch roller 62. A range of the first conveying path 26 is indicated by an arrow 26A. The first conveying path 26 is formed in a substantially plate shape, as shown in FIGS. 3 and 6. The first conveying path 26 includes an image reading position 19 where the image sensor 24 reads the first surface of the original sheet.

The curved conveying path 27 is connected with the first conveying path 26, and is curved downward in an arc shape. More specifically, as shown in FIG. 6, the curved conveying path 27 is a conveying path from a nip point of after-mentioned main roller 64 and pinch roller 62 to an after-mentioned opening 84 (an example of an opening according to the present invention). A range of the curved conveying path 27 is indicated by an arrow 27A.

The second conveying path 28 is connected with the curved conveying path 27, and extends to the upper right in the figure toward the sheet-discharge tray 14 in FIGS. 4 and 6. More specifically, as shown in FIG. 6, the second conveying path 28 is a conveying path from an after-mentioned opening 84 to a left side of an after-mentioned discharge unit 70 (a discharge roller 72 and a pinch roller 74). A range of the second conveying path 28 is indicated by an arrow 28A. The second conveying path 28 includes an image reading position 21 where the image sensor 25 reads the second surface of the original sheet.

The ADF 11 includes a housing. This housing includes a body frame 30, the aforementioned upper cover 32, an upper guide 34, and an under guide 36. The upper cover 32, the upper guide 34, and the under guide 36 are mounted to the body frame 30. The housing is formed of acrylonitrile-butadiene-styrene (ABS) copolymer, polypropylene (PP), polyacetal (POM), or other types of synthetic resins.

The upper guide 34 and the under guide 36 are disposed vertically in two levels. By mounting the under guide 36 to the body frame 30, the second conveying path 28 is formed between the body frame 30 and the under guide 36. That is, the under guide 36 forms a guide surface of the second conveying path 28. The upper guide 34 is mounted above the under guide 36. As shown in FIGS. 2 and 4, an opening 84 is provided in a lower surface 31 of the ADF 11. The opening 84 is provided at an end situated at a boundary portion between the second conveying path 28 and the curved conveying path 27. By providing the opening 84, the boundary portion between the second conveying path 28 and the curved conveying path 27 is exposed to the lower surface of the ADF 11. The opening 84 is positioned across a width indicated by an arrow 85. An after-mentioned predetermined position 18 is included in a range of the opening 84. Therefore, when the image sensor 25 is disposed in the predetermined position 18, the image sensor 25 can read the front surface of the original sheet at the image reading position 21.

Figure 5:
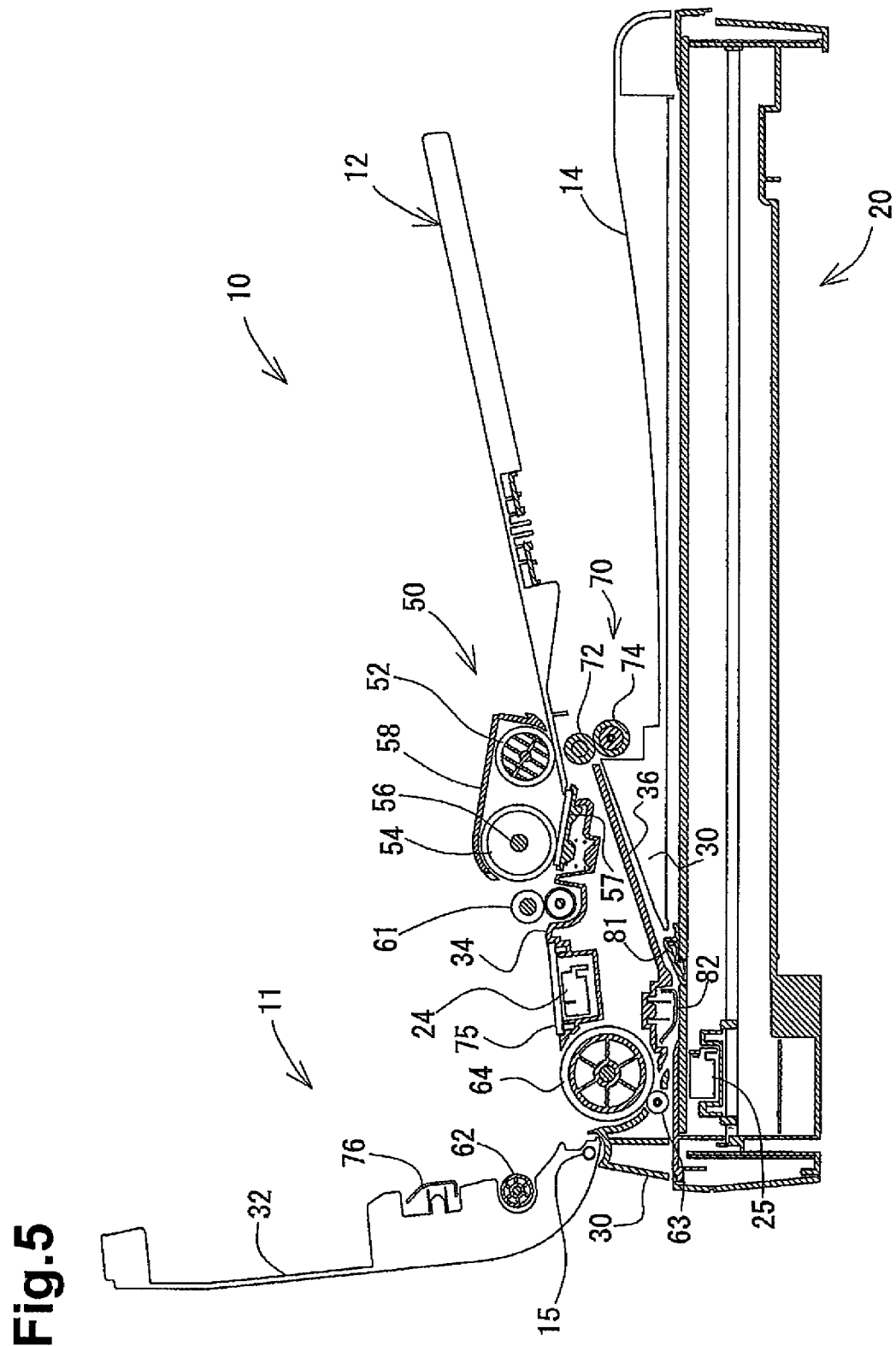
FIG. 5 is a sectional view of the image processing apparatus according to the embodiment of the present invention.

FIG. 5 is a sectional view of the image processing apparatus 10 which is taken along line IV-IV in FIG. 1, like FIG. 4. But FIG. 5 shows the image processing apparatus 10 in a state in which the aforementioned upper cover 32 is open, unlike FIG. 4.

The upper cover 32 is rotatably supported by a support shaft 15 mounted to the left end (in FIG. 5) of the body frame 30, and can be opened and closed. That is, the upper cover 32 can change its position between a closed position (shown in FIG. 4) and an open position (shown in FIG. 5). When the upper cover 32 is in the closed position, as shown in FIG. 4, a portion extending from the first conveying path 26 to the upper guide 34 is covered by the upper cover 32. A portion of the curved conveying path 27, the sheet-feed unit 50, the conveying roller 61, the pinch roller 65 and a portion of the original tray 12 are also covered by the upper cover 32.

When the upper cover 32 is in the closed position, as shown in FIG. 6, the first conveying path 26 is formed between the upper cover 32 and the upper guide 34. That is, the upper cover 32 partly forms a guide surface of the first conveying path 26.

As shown in FIG. 5, when the position of the upper cover 32 changes to the open position, the portion extending from the first conveying path 26 to the upper guide 34 is exposed. A portion of the curved conveying path 27, the sheet-feed unit 50, the conveying roller 61, the pinch roller 65 and a portion of the original tray 12 are also exposed. As shown in FIGS. 3 and 5, the pinch roller 62 and a first white member 76 are positioned on the upper cover 32. More specifically, a rotary shaft 62A of the pinch roller 62 is supported by the upper cover 32 (see FIG. 3). The first white member 76 is supported by the upper cover 32 via a coil spring 77. Therefore, when the position of the upper cover 32 changes to the open position, all the first conveying path 26 and a portion of the curved conveying path 27 are exposed. As a result, when a jamming of the original sheet occurs, the user can easily carry out a jamming prevention operation by changing the position of the upper cover 32 to the open position.

[Sheet-Feed Unit]

FIG. 6 is an enlarged view of the main portion in FIG. 4, and shows in detail the U-turn conveying path 16 and the vicinity thereof.

As shown in FIGS. 4 and 6, a sheet-feed unit 50 is disposed adjacent to the first conveying path 26. The sheet-feed unit 50 sequentially takes out the original sheets held in the stacked state one at a time in order from top from the original tray 12. The sheet-feed unit 50 is provided upstream of the first conveying path 26 in the conveying direction (that is, at the right side in FIGS. 4 and 6). The sheet-feed unit 50 includes a take-in roller 52 and a separation roller 54 having a rotary shaft 56. As is clear from FIG. 3, both ends of the rotary shaft 56 are supported by the body frame 30. The separation roller 54 is secured to the almost center of the rotary shaft 56. The rotary shaft 56 is rotated in a predetermined direction (clockwise in FIG. 4) by an ADF motor (not shown) serving as a driving source. The separation roller 54 is rotated by rotating the rotary shaft 56.

An arm 58 is supported by the rotary shaft 56 through a bearing. The arm 58 extends toward upstream in the conveying direction from the rotary shaft 56. The take-in roller 52 is disposed an end upstream of the arm 58 in the conveying direction. The arm 58 is rotated through a predetermined driving transmission mechanism (not shown) by using the ADF motor serving as the driving source. Therefore, the arm 58 can move up and down with respect to the rotary shaft 56 as center. The take-in roller 52 is also connected to the rotary shaft 56 through a predetermined driving transmission mechanism. By this, if the rotary shaft 56 rotates, not only the separation roller 54, but also the take-in roller 52 rotates clockwise. The outside diameter of the take-in roller 52 and the outside diameter of the separation roller 54 are set the same, so that both of the rollers 52 and 54 are rotated at the same peripheral speed.

The sheet-feed unit 50 also includes a separation portion 57. The separation portion 57 is disposed so as to oppose the separation roller 54. The separation portion 57 is configured to press-contact the roller surface of the separation roller 54. The separation portion 57 is typically formed of a cork piece or an elastomer, and provides a large friction force between it and an original sheet. Therefore, if a plurality of original sheets are inserted between the separation portion 57 and the separation roller 54, at a nip point 89 (see FIG. 7) of the separation roller 54, only the original sheet that is in contact with the separation roller 54 is separated from other original sheets and conveyed toward the U-turn conveying path 16.

A plurality of original sheets in a stacked state are placed on the original tray 12. At this time, an original sheet is place in a state that an end of each original sheet is inserted into the sheet-feed unit 50. Furthermore, at this time, the original sheets are placed on the original tray 12 with the front surface (a surface of odd pages, an upper surface, a second surface) faced upward. An image recorded on the back surface (a surface of even pages, a lower surface, a first surface) of the original sheet taken out from the original tray 12 by the ADF 11 is read by the image sensor 24. The original sheet is further conveyed along the U-turn conveying path 16, and its front and back surfaces are reversed when the original sheet passes along the curved conveying path 27. Then, an image recorded on the front surface of the original sheet is read by the image sensor 25. Thereafter, the original sheet discharged to the sheet-discharge tray 14 has its front surface faced downward and is placed on the sheet-discharge tray 14. Therefore, even if a plurality of the original sheet are conveyed by the ADF 11 to read the image thereon, an order of the page of the original sheets will not be changed from a case that the original sheets are placed on the original tray 12 to a case that the original sheets are stacked on the discharge tray 14, though the original sheets will be turned upside down.

[Conveying Unit]

As shown in FIG. 6, a conveying unit 60 includes a conveying roller 61 (an example of a first conveying roller according to the present invention), a main roller 64, a pinch roller 62 (an example of a second conveying roller according to the present invention), and a pinch roller 63 (an example of a third conveying roller according to the present invention).

The conveying roller 61 is disposed adjacent to the first conveying path 26. More specifically, the conveying roller 61 is disposed immediately in front of the first conveying path 26 in the conveying direction, and is positioned more downstream in the conveying direction than the separation roller 54. The conveying roller 61 form a pair of rollers with the pinch roller 65. The original sheet conveyed from the separation roller 54 is nipped by the conveying roller 61 and the pinch roller 65. The conveying roller 61 rotates to supply the original sheet to the first conveying path 26.

As shown in FIG. 6, the main roller 64 is disposed at an end portion (left end portion in FIG. 6) of the body frame 30. The body frame 30, the upper cover 32 of the ADF 11, and the main roller 64 form the curved conveying path 27. That is, the body frame 30, an inner wall surface of the upper cover 32, and the outer peripheral surface of the main roller 64 form a guide surface of the curved conveying path 27. As is clear from FIG. 3, the main roller 64 comprises three rollers that are supported by only one driving shaft 67 and are disposed at a predetermined interval. The central main roller 64 of the three main rollers 64 forms a pair of rollers with the pinch roller 62, and a pair of rollers with the pinch roller 63. The pinch roller 62 is disposed at a boundary between the first conveying path 26 and the curved conveying path 27 as mentioned above. The original sheet conveyed along the first conveying path 26 is nipped by the main roller 64 and the pinch roller 62, and is conveyed along the curved conveying path 27 in the conveying direction. The pinch roller 63 is disposed downstream of the curved conveying path 27 in the conveying direction. The original sheet conveyed along the curved conveying path 27 is nipped by the main roller 64 and the pinch roller 63, and is conveyed toward the second conveying path 28. Although, in the embodiment, the main roller 64 comprising only one driving shaft 67 forms pairs of rollers with the pinch rollers 62 and 63, a plurality of driving rollers that form pairs with these rollers 62 and 63, respectively, may be provided along the curved conveying path 27. This is a configuration in which the plurality of the driving rollers each comprising a driving shaft are provided along the curved conveying path 27, a pinch roller is provided on each of the plurality of the driving rollers. The configuration of this embodiment, in which the main roller 64 comprising only one driving shaft 67 forms pairs of rollers with the pinch rollers 62 and 63, can realize reduction of configuration and downsizing by reducing the number of the driving rollers and a drive mechanism. At a position along the curved conveying path 27 between the pinch rollers 62 and 63, other pinch roller may be provided to press the main roller 64.

The conveying roller 61 and the main roller 64 include driving shafts 66 and 67, respectively. These driving shafts 66 and 67 are driven through a predetermined driving transmission mechanism by the ADF motor (not shown) as the driving source. By this, the original sheet is conveyed in the conveying direction along the first conveying path 26 and the curved conveying path 27. The pinch roller 62 is supported by the upper cover 32. Therefore, by setting the upper cover 32 in the closed position, the original sheet can be nipped between the pinch roller 62 and the main roller 64, whereas, by setting the upper cover 32 in the open position, the original sheet can be unnipped.

[Various Sensors]

Figure 7:
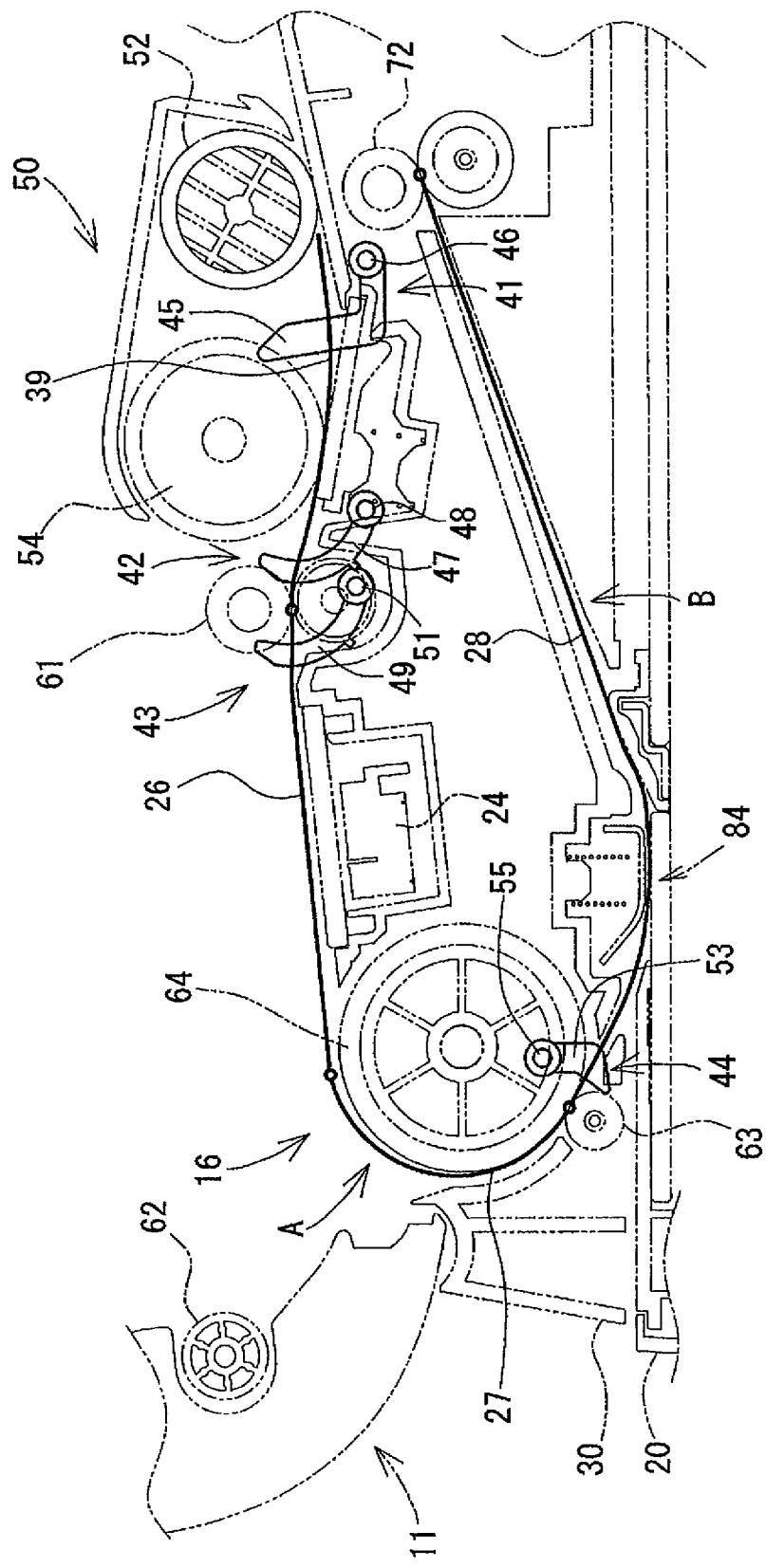
FIG. 7 shows a U-turn conveying path of the image processing apparatus according to the embodiment of the present invention, and the positions of sensors disposed in the vicinity thereof.

As shown in FIG. 7, a first sensor 41, a second sensor 42, a third sensor 43, and a fourth sensor 44 are provided at the U-turn conveying path 16 and in the vicinity thereof.

The first sensor 41 detects that original sheets are set on the original tray 12. The first sensor 41 includes a rotator 45 and an optical sensor (typically, a photointerrupter). The rotator 45 protrudes towards the sheet-feed unit 50, and crosses an original-sheet supply path 39. The supply path 39 extends from the take-in roller 52 to the first conveying path 26. By rotating the rotator 45 around a support shaft 46, it can appear at the supply path 39. In the embodiment, the rotator 45 is resiliently urged so as to normally protrude into the supply path 39. By causing a recording sheet that is conveyed along the supply path 39 to contact the rotator 45, the rotator 45 retreats from the supply path 39. This causes the optical sensor to be turned on or off. The controlling section 100 determines the existence of the original sheet on the basis of a signal that is output from the optical sensor.

The second sensor 42 detects that the original sheet has been separated by the separation roller 54. Similarly to the first sensor 41, the second sensor 42 includes a rotator 47 and an optical sensor. The rotator 47 protrudes towards the sheet-feed unit 50, and crosses the original-sheet supply path 39. By rotating the rotator 47 around a support shaft 48, it can appear at the supply path 39. Similarly to the rotator 45 of the first sensor 41, the rotator 47 is resiliently urged so as to normally protrude into the supply path 39. By causing the recording sheet that is conveyed along the supply path 39 to contact the rotator 47, the rotator 47 retreats from the supply path 39. This causes the optical sensor to be turned on or off. The controlling 100 section determines the existence of the original sheet on the basis of a signal that is output from the optical sensor.

The third sensor 43 (an example of a first sheet detector according to the present invention) detects that the original sheet has entered the first conveying path 26. The third sensor 43 also includes a rotator 49 and an optical sensor. The rotator 49 protrudes towards the sheet-feed unit 50, and crosses an end portion (end portion at the back side in the conveying direction) of the first conveying path 26. By rotating the rotator 49 around a support shaft 51, it can appear at the end portion of the first conveying path 26. The rotator 49 is resiliently urged so as to normally protrude into the first conveying path 26. By causing the recording sheet that has entered the first conveying path 26 to contact the rotator 49, the rotator 49 retreats from the first conveying path 26. This causes the optical sensor to be turned on or off. The controlling 100 section determines the existence of the original sheet on the basis of a signal that is output from the optical sensor.

The fourth sensor 44 (an example of a second sheet detector) detects that the original sheet has passed along the curved conveying path 27 and has entered the second conveying path 28. The fourth sensor 44 also includes a rotator 53 and an optical sensor. The rotator 53 protrudes towards the image reading device 20 (downward in FIG. 7), and crosses the curved conveying path 27. More specifically, the rotator 53 is positioned close to the pinch roller 63, and crosses a portion that is closer to the front side in the conveying direction than the pinch roller 63. By rotating the rotator 53 around a support shaft 55, it can appear at the curved conveying path 27. The rotator 49 is resiliently urged so as to normally protrude into the curved conveying path 27. By causing the recording sheet that has passed the front side of the curved conveying path 27 to contact the rotator 53, the rotator 53 retreats from the curved conveying path 27. This causes the optical sensor to be turned on or off. The controlling 100 section determines the existence of the original sheet, that is, whether or not the original sheet is nipped by the pinch roller 65, on the basis of a signal that is output from the optical sensor.

Both ends of the support shafts 46, 58, 51, and 55 that support the rotators 45, 47, 49, and 53 of the respective sensors 41 to 44 are supported at predetermined positions of the body frame 30. As mentioned above, the rotators 45, 47, 49, and 53 are resiliently urged. Members that resiliently urge these rotators are typically, for example, torsion coil springs.

[Discharge Unit]

As shown in FIG. 6, a discharge unit 70 includes a discharge roller 72 (an example of a fourth conveying roller according to the present invention) and a pinch roller 74. The discharge roller 72 includes a driving shaft 71. The driving shaft 71 is driven through a predetermined driving transmission mechanism by the ADF motor serving as the driving source. The discharge roller 72 is disposed immediately behind the second conveying path 28 in the conveying direction. The discharge roller 72 and the pinch roller 74 nip the original sheet conveyed along the second conveying path 28, and convey it in the conveying direction. Since the second conveying path 28 extends obliquely upward as mentioned above, the discharge roller 72 is positioned above the sheet-discharge tray 14. Therefore, the original sheet that passes the discharge roller 72 and that is discharged falls onto the sheet-discharge tray 14. Furthermore, since the discharge unit 70 is disposed below the sheet-feed unit 50, more specifically below the take-in roller 52, the second conveying path 28 is longer than the first conveying path 26, as shown by arrows 26A and 28A in FIG. 6. Therefore, even if an angle that the second conveying path 28 slants obliquely upward is not so large, that is, even if the second conveying path 28 has a gentle slant, an after-mentioned lift amount 88 can be large. As a result, a large amount of the original sheets can be held on the discharge tray 14, while a height of the ADF 11 can be downsized vertically.

The discharge roller 72 and the pinch roller 74 may not be disposed immediately behind the second conveying path 28 in the conveying direction. If the original sheet can be guided from the second conveying path 28 to the discharge tray 14, the discharge roller 72 and the pinch roller 74 may be disposed in the second conveying path 28 in the conveying direction.

[First Image Reading Section]

As mentioned above, the first image reading section (an example of a first image reading section according to the present invention) is provided at the ADF 11. The first image reading section comprises an image sensor 24, a first image reading glass 75, a first white member 76 and a coil spring 77. The first image reading glass 75 is tabular and a surface of the first image reading glass 75 is disposed along the substantially planate first conveying path 26. The first image reading glass is disposed between the conveying roller 61 and the pinch roller 62, and the image sensor 24 is provided so as to face the first conveying path 26 from below via the first image reading glass 75. The image sensor 24 is disposed in space enclosed with the first conveying path 26, the main roller 64 and the second conveying path 28. Therefore, the original sheet that is conveyed along the substantially planate first conveying path 26 passes near the image sensor 24 along the first image reading glass 75. Here, an image recorded on the back surface (first surface) of the original sheet is read at the image reading position 19 by the image sensor 24. The first white member 76 is disposed so as to oppose the image sensor 24 via the first image reading glass 75. As shown in FIG. 3, the first white member 76 has almost the same length as the first image reading glass 75 in a longitudinal direction. A coil spring 77 is provided at the first white member 76. By this, the first white member 76 is resiliently urged toward the first image reading glass 75, that is, the image sensor 24. Therefore, the first white member 76 pushes the original sheet that is conveyed along the first conveying path 26 against the first image reading glass 75. As a result, a distance between the image sensor 24 and the back surface of the original sheet becomes constant, and a good image reading operation can be performed by a CIS whose depth of focus is smaller than a CCD. At least a surface of the first white member 76 that faces the first image reading glass 75 is white in color. By this, at a predetermined timing before reading an image, a processing of taking a white standard when the image sensor 24 reads an image is performed, but the processing is known and is not described here.

As mentioned above, the configuration of this embodiment, in which a plurality of the pinch rollers 62 and 63 are pressed against the main roller 64 comprising only one driving shaft 67, can realize reduction of configuration and downsizing by reducing the number of the driving rollers and a drive mechanism. But in this case the first image reading section needs to be disposed on the substantially planate first conveying path 26.

If the first image reading section is disposed downstream of the opening 84 of the second conveying path 28 in the conveying direction, a jamming prevention operation becomes more difficult, and the sheet-feed unit 50, the conveying roller 61 and the pinch roller 65 will be disposed above the first image reading section. By this, the image processing apparatus 10 will be larger vertically in size.

The first white member 76 of this embodiment is made of a sheeted member, but may be made of a rotary roller with a white surface instead. In this case, the rotary roller may have almost the same length as the first image reading glass 75 in a longitudinal direction and may be disposed so as to contact the first image reading glass 75 at the first image reading position 19. In this case, the rotary roller may be resiliently urged toward the first image reading glass 75, that is, the image sensor 24, by an urging member such as the coil spring 77.

[Second Image Reading Section]

As mentioned above, the second image reading section (an example of a second image reading section according to the present invention) is provided at a side of the image reading device 20. The second image reading section comprises an image sensor 25, a stationary reading glass 79, a second white member 82 and a coil spring 83. The image sensor 25 is slidably supported by a slide shaft 78. The slide shaft 78 is secured to a housing of the image reading device 20, and extends in the illustrated left-right direction as shown in FIGS. 4 and 6. That is, the slide shaft 78 extends in the original-sheet conveying direction and in a direction opposite thereto. The image sensor 25 slides through a predetermined driving transmission mechanism by a motor (not shown) as a driving source. An example of the driving transmission mechanism in this case is a pulley-belt mechanism.

The contact glass 22 of the image reading device 20 is divided in two. That is, the contact glass 22 includes a stationary reading glass 79 and a moving reading glass 80. When the ADF 11 is not used, original sheets are placed at a predetermined position on the moving reading glass 80 one at a time by the user of the image processing apparatus. Then, images that are recorded on the original sheets facing the moving reading glass 80 are read while sliding the image sensor 25 along the slide shaft 78.

When the ADF 11 is used, the original sheets continuously pass the stationary reading glass 79. An original separation member 81 is provided between the stationary reading glass 79 and the moving reading glass 80. The original separation member 81 takes up from the stationary reading glass 79 the original sheet that has entered the second conveying path 28 and that has contacted the stationary reading glass 79. This causes the original sheet to separate from the stationary reading glass 79 and to be conveyed along the second conveying path 28.

When the ADF 11 is used, the image sensor 25 is moved to a predetermined position 18 and is stopped. By stopping the image sensor 25 at the predetermined position 18, the image sensor 25 is provided so as to face the second conveying path 28 from below via the stationary reading glass 79. The predetermined position 18 is situated at an end portion of the stationary reading glass 79 and adjacent to the original separation member 81. The original sheet is conveyed between the stationary reading glass 79 and the second white member 82 and reaches an actual image reading position 21, and is, then, taken up from the stationary reading glass 79 by the original separation member 81. The original sheet is always exposed from the opening 84 when it passes the image reading position 21. That is, an image that has been recorded on the front surface of the original sheet is exposed from the opening 84. The image sensor 25 in a standby state at the predetermined position 18 reads the exposed image at the image reading position 21.

A second white member 82 is disposed at a position corresponding to the image reading position 21. As shown in FIG. 2, the second white member 82 has almost the same length as the stationary reading glass 79 in a longitudinal direction. More specifically, the second white member 82 is provided at the under guide 36 of the ADF 11 via the coil spring 83. The second white member 82 faces the image sensor 25 in the standby state at the predetermined position 18 via the stationary reading glass 79. Therefore, the second white member 82 is resiliently urged toward the stationary reading glass 79, that is, the image sensor 25. When an edge of the original sheet that is conveyed along the second conveying path 28 reaches the second white member 82, the original sheet moves into a space between the second white member 82 and the stationary reading glass 79. The second white member 76 pushes the original sheet against the stationary reading glass 79. As a result, a distance between the image sensor 25 and the front surface of the original sheet becomes constant, and a good image reading operation can be performed by a CIS whose depth of focus is smaller than a CCD. At least a surface of the second white member 82 that faces the stationary reading glass 79 is white in color. By this, at a predetermined timing before reading an image, a processing of taking a white standard when the image sensor 25 reads an image is performed, but the processing is known and is not described here.

The second white member 82 of this embodiment is made of a sheeted member, but may be made of a rotary roller with a white surface instead. In this case, the rotary roller may have almost the same length as the stationary reading glass 79 in a longitudinal direction and may be disposed so as to contact the stationary reading glass 79 at the second image reading position 21. In this case, the rotary roller may be resiliently urged toward the stationary reading glass 79, that is, the image sensor 25, by an urging member such as the coil spring 83.

If the configuration of this embodiment is used, the first image reading section is disposed below (lower than) the sheet-feed unit 50. The first white member 76 and the first image sensor 24 of the first image reading section, and the second white member 82 and the coil spring 83 of the second image reading section are vertically disposed in space between the main roller 64 comprising only one drive shaft 67 and the sheet-feed unit 50. The first white member 76 and the first image sensor 24 of the first image reading section, and the second white member 82 and the coil spring 83 of the second image reading section are also vertically disposed in space between the curved conveying path 27 and the sheet-feed unit 50. As a result, the image processing apparatus 10 can be downsized vertically.

Figure 8:
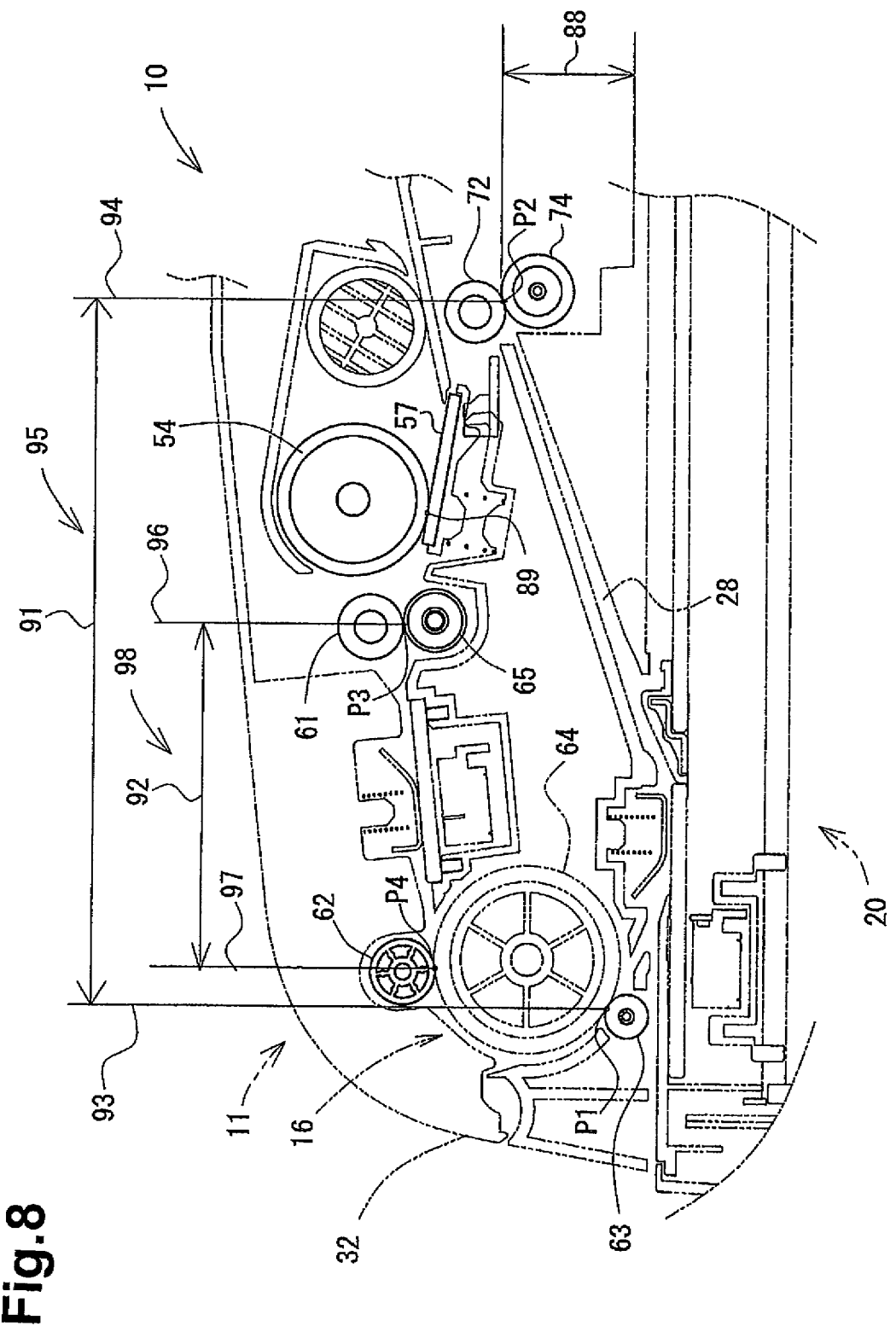
FIG. 8 is a layout of an ADF driving system of the image processing apparatus according to the embodiment of the present invention.

FIG. 8 is a layout of a driving system of the ADF 11.

As shown in FIG. 8, in the ADF 11 according to the embodiment, the conveying roller 61 and the pinch roller 62 are positioned between the pinch roller 63 and the discharge roller 72. More specifically, a distance 91 between the pinch roller 63 and the discharge roller 72 is equal to the distance between a first span point P1 and a second span point P2. The first span point P1 is a nip point between the pinch roller 63 and the main roller 64. The second span point P2 is a nip point between the discharge roller 72 and the pinch roller 74. A distance 92 between the conveying roller 61 and the pinch roller 62 is the distance between a third span point P3 and a fourth span point P4. The third span point P3 is a nip point between the conveying roller 61 and the pinch roller 65. The fourth span point P4 is a nip point between the pinch roller 62 and the main roller 64. The distance 91 is greater than the distance 92, and the conveying roller 61 and the pinch roller 62 are positioned within an imaginary area 95 formed by imaginary lines 93 and 94 extending upward from the first span point P1 and the second span point P2, respectively.

The nip point 89 of the separation roller 54 exists within the imaginary area 95. However, the nip point 89 exists outside an imaginary area 98 formed by an imaginary line 96 and 97 extending upward from the third span point P3 and the fourth span point P4, respectively. Further, the nip point 89 is disposed closer to the second conveying path 28 than the third span point P3, that is, below the third span point P3.

The positions of the conveying roller 61, the pinch roller 62, the pinch roller 63, and the discharge roller 72 are determined in this way. Therefore, a distance A (an example of a first distance according to the present invention) along the U-turn conveying path 16 from the conveying roller 61 to the pinch roller 63 is determined; and a distance B (an example of a second distance according to the present invention) along the U-turn conveying path 16 from the pinch roller 63 to the discharge roller 72 is determined. In the embodiment, the distance B is greater than the distance A. Still further, a distance difference D between the distance A and the distance B is also determined.

[Controlling Section]

Figure 9:
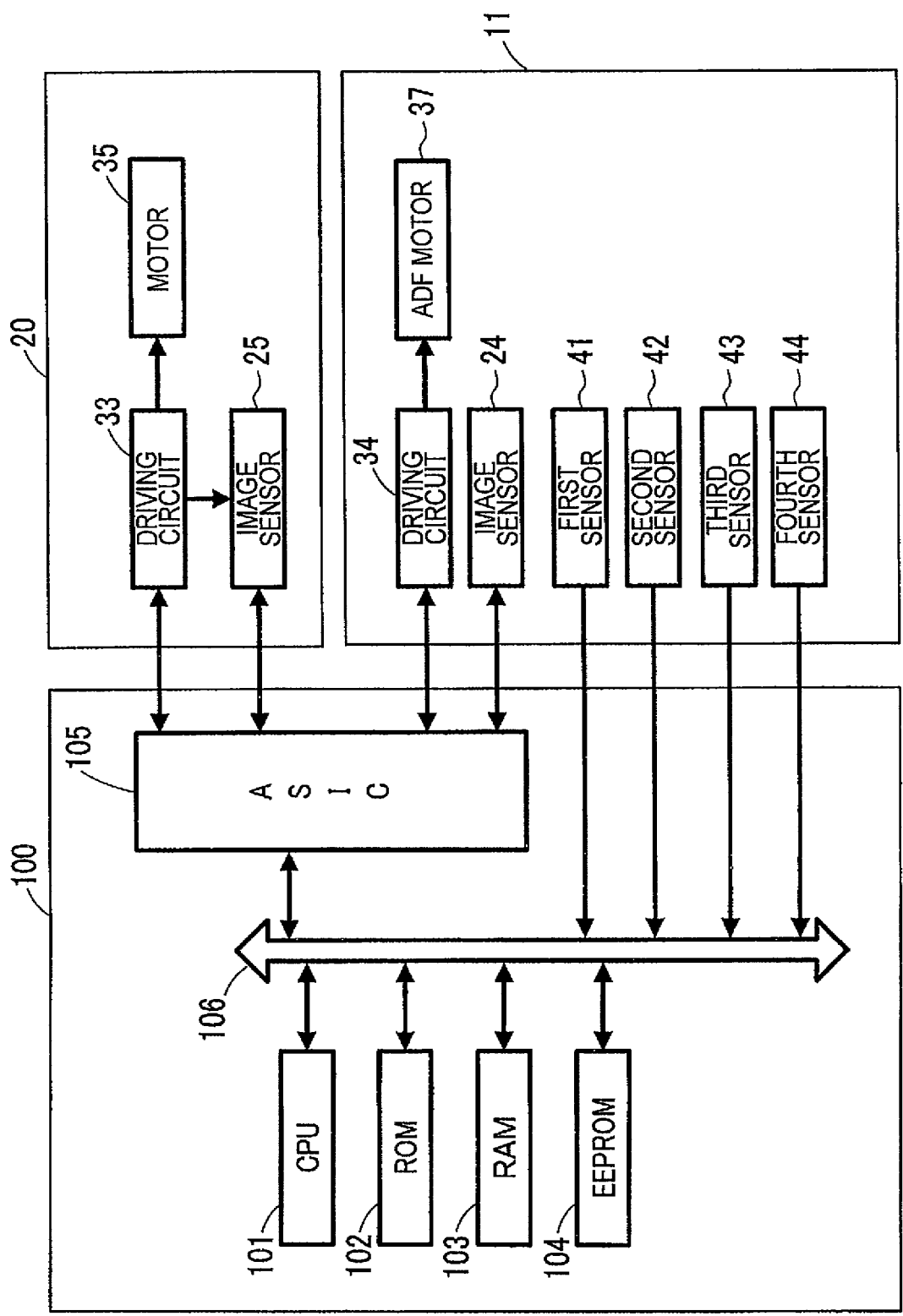
FIG. 9 is a block diagram of the structure of a controlling section of the image processing apparatus according to the embodiment of the present invention.

FIG. 9 is a block diagram of the structure of the controlling section 100.

The controlling section 100 generally controls all the operations of the image processing apparatus 10. The controlling section 100 is formed as a microcomputer that primarily includes a CPU 101, ROM 102, RAM 103, EEPROM 104, and an application specific integrated circuit (ASIC) 105. The CPU 101, ROM 102, RAM 103, EEPROM 104, and ASIC 105 are connected so as to allow communication through a bus 106.

ROM 102 stows various programs (programs used for controlling the ADF 11 and the image reading device 20 by the CPU 101). RAM 103 is used as a storage area for temporarily storing various data when the CPU 101 executes the aforementioned programs or as a working area for, for example, data processing. EEPROM 104 stores, for example, flags or settings to be held after a power supply is turned off.

The image reading device 20 is connected to the ASIC 105. The image reading device 20 executes an image reading operation of an original sheet, and outputs the image that has been read by the image sensor 25 as an image signal. The image reading device 20 includes a driving circuit 33 and the motor 35. The driving circuit 33 energizes the motor 35 using a driving signal, on the basis of, for example, a phase excitation signal input from the ASIC 105. The motor 35 is, for example, a stepping motor. The motor 35 rotates by receiving the driving signal from the driving circuit 33. This causes the image sensor 25 to move. In addition, the driving circuit 33 also, for example, adjusts operating current for turning on a light source of the image sensor 25.

The ADF 11 is also connected to the ASIC 105. The ADF 11 executes an image reading operation of the original sheet performed by the image sensor 24, and outputs an image that has been read by the image sensor 24 as an image signal. The ADF 11 includes the driving circuit 33 for driving the ADF motor 37. The ADF motor 37 is also a stepping motor, and can rotate in a forward direction and in a reverse direction. The driving circuit 33 receives an output signal from the ASIC 105, and generates a pulse signal for rotating the ADF motor 37. On the basis of the pulse signal, the ADF motor 37 is rotationally driven. In the embodiment, the ADF motor 37 itself functions as rotation amount detecting means that detects the amount of rotation of, for example, the conveying roller 61. The ADF motor 37 drives the take-in roller 52, the separation roller 54, the conveying roller 61, and the discharge roller 72 through a driving transmission mechanism not shown). This causes the original sheet to be conveyed along the U-turn conveying path 16.

Through a sensor input circuit (not shown), the first sensor 41, the second sensor 42, the third sensor 43, the fourth sensor 44, and the ADF motor 37, serving as the rotation amount detecting means, are connected to the controlling section 100. Signals that have been output from the respective sensors 41 to 44 whose noise has been removed by the sensor input circuit are output to the controlling section 100.

[Outline of Conveyance of Original Sheet]

In the image processing apparatus 10, an original sheet is take out from the ADF 11 and conveyed in accordance with the following outline. FIGS. 10 to 13 are each a flowchart of the outline for conveying an original sheet by the image processing apparatus 10.

Figure 10:
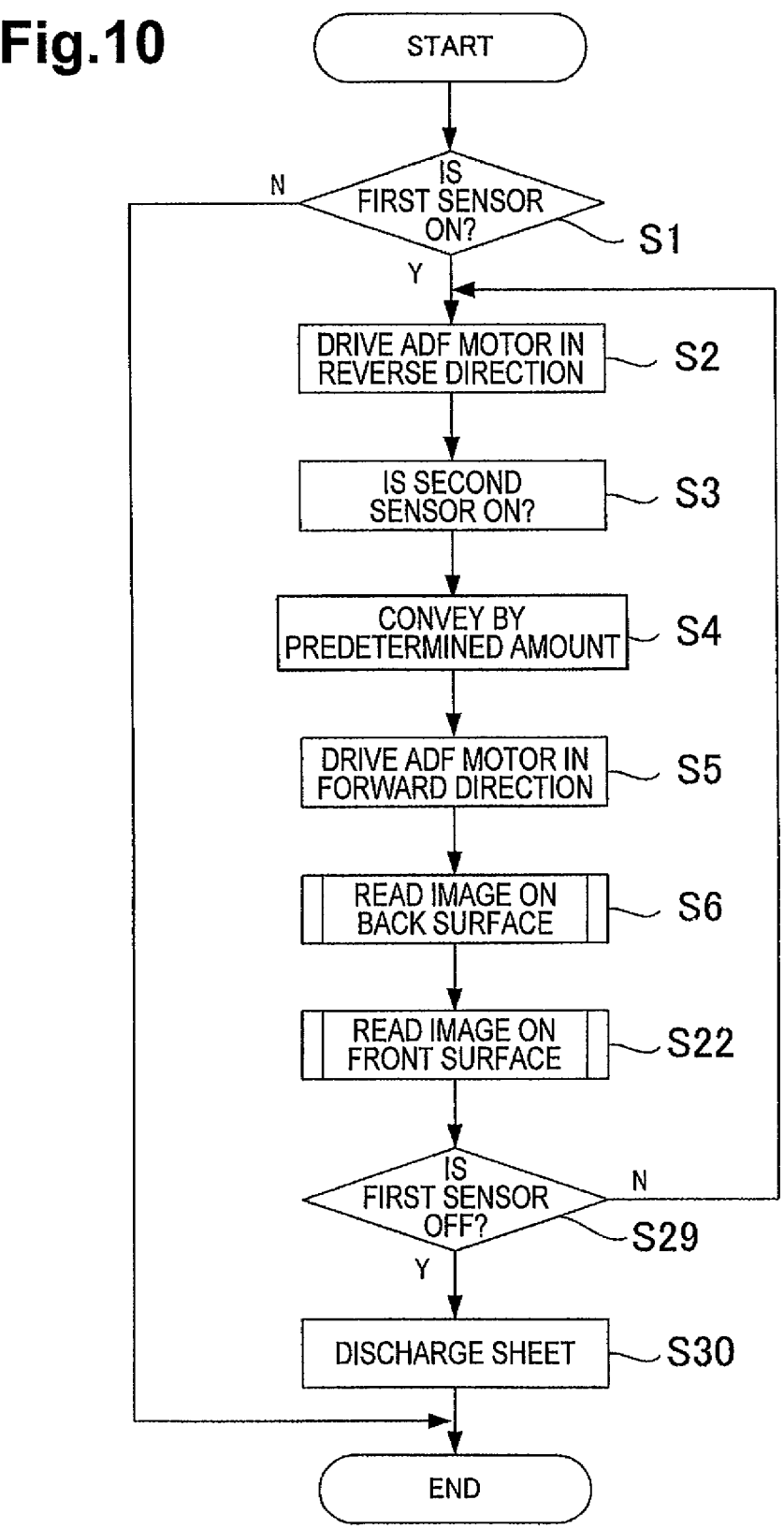
FIG. 10 is a flowchart of the outline for conveying an original sheet by the image processing apparatus according to the embodiment of the present invention.

When the operation of the image processing apparatus 10 is started, it is determined whether or not an original sheet exists at the sheet-feed unit 50 (see FIG. 10). More specifically, it is determined whether or not the first sensor 45 is on (Step S1). If an original sheet does not exist at the sheet-feed unit 50 ("N" in Step S1), the operation of the image processing apparatus 10 is ended. If an original sheet to be processed does exist at the sheet-feed unit 50 ("Y" in Step S1), the ADF motor 37 is driven (Step S2). In this ease, the ADF motor 37 rotates in the reverse direction. Even if the ADF motor 37 is rotated in the reverse direction, the take-in roller 52 and the separation roller 54 are rotated in the forward direction by the driving transmission mechanism. That is, the take-in roller 52 and the separation roller 54 rotate clockwise in FIG. 7, and the original sheet is conveyed towards the conveying roller 61 along the supply path 39.

If the original sheet is conveyed along the supply path 39, the second sensor 42 is turned on (Step S3). If the second sensor 42 is turned on, it detects that the original sheet that has been separated by the separation roller 54 has reached the conveying roller 61. That is, the front edge of the original sheet has reached the first conveying path 26. In this state; the take-in roller 52 and the separation roller 54 are rotated to convey the original sheet by a predetermined amount (Step S4). The predetermined amount is determined by the number of steps of the ADF motor 37. Thereafter, the ADF motor 37 is rotated in the forward direction (Step S5). When the ADF motor 37 is rotated in the forward direction, the driving transmission mechanism does not transmit driving force to the lake-in roller 52 and the separation roller 54. Therefore, the take-in roller 52 and the separation roller 54 are stopped.

Figure 11:
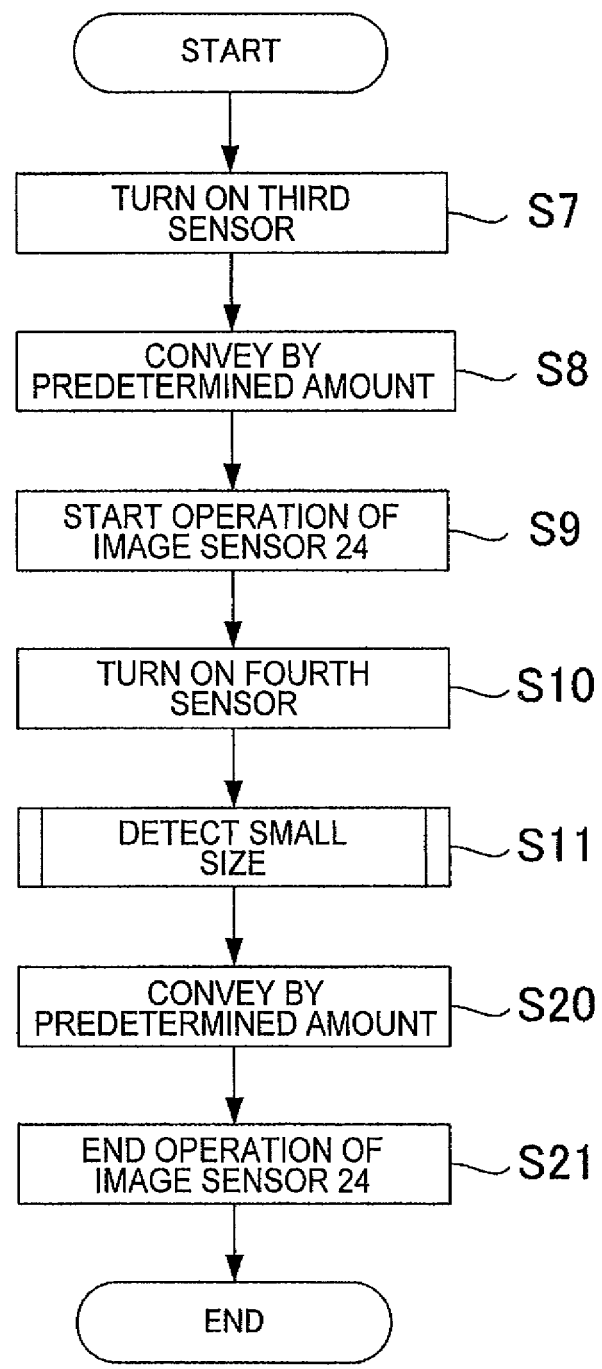
FIG. 11 is a flowchart of the outline for conveying the original sheet by the image processing apparatus according to the embodiment of the present invention.
Figure 12:
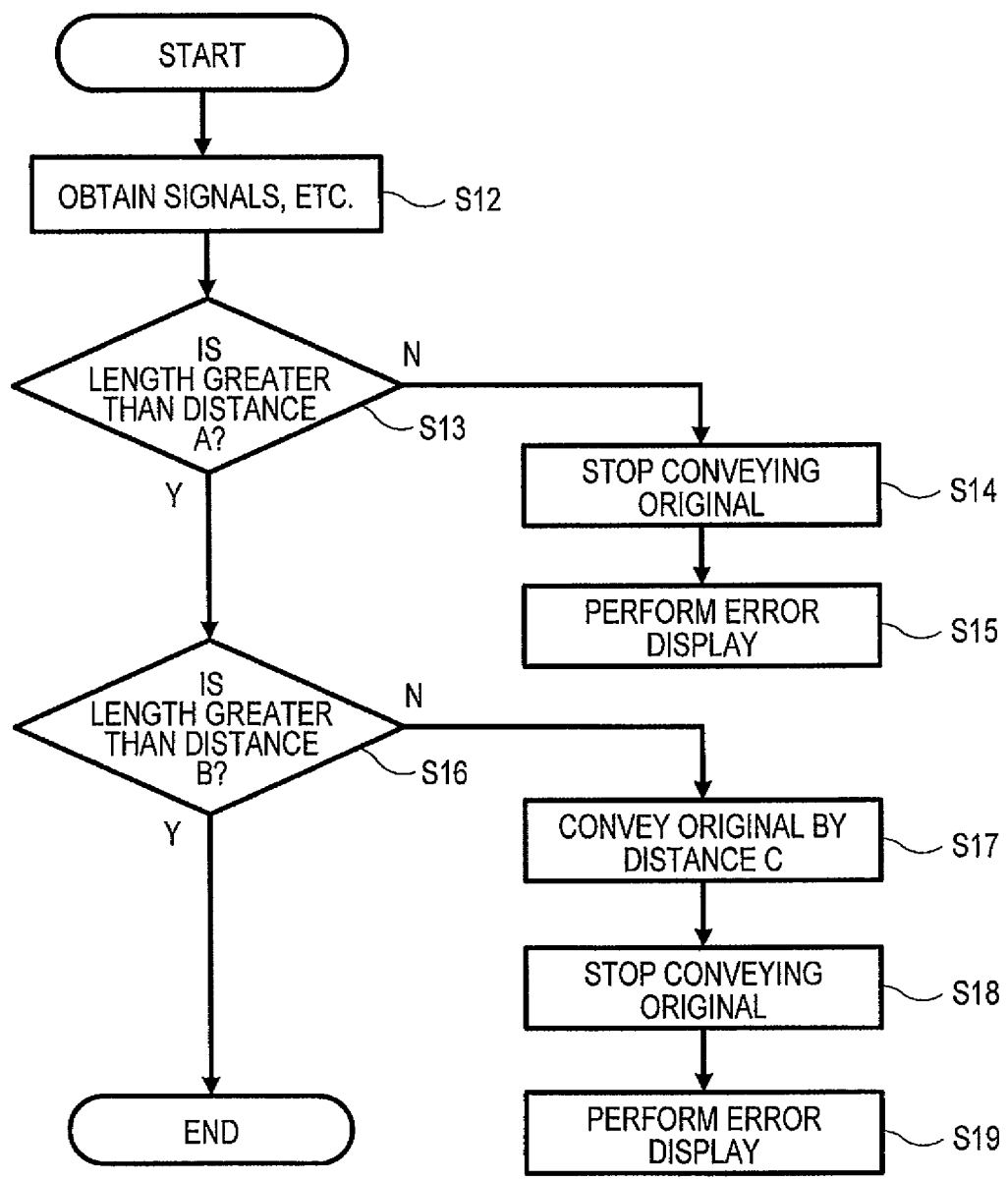
FIG. 12 is a flowchart of the outline for conveying the original sheet by the image processing apparatus according to the embodiment of the present invention.

Images on the conveyed original sheet are read. First, the image that has been recorded on the back surface of the original sheet is read (Step S6). By rotating the ADF motor 37 in the forward direction, the original sheet is conveyed along the first conveying path 26 by the conveying roller 61. As shown in FIG. 11, when the original sheet enters the first conveying path 26, the third sensor 43 is immediately turned on (Step S7). By this, that the front edge of the original sheet has entered the first conveying path 26 is detected. A signal that is output by the third sensor 43 (an example of a first signal according to the present invention) when the state of the third sensor 43 is changed from an off state to an on state indicates that the original sheet exists at the first conveying path 26. When the state of the third sensor 43 is changed from the on state to the off state, the first signal that the third sensor 43 outputs ceases to exist, thereby indicating that the original sheet does not exist at the first conveying path 26. At this time, the CPU 101 of the controlling section 100 determines that the third sensor 43 has output a second signal (an example of a second signal according to the present invention).

Here, when the state of the third sensor is changed from the on state to the off state, the third sensor 43 outputs the second signal instead of the first signal. The distance of conveyance of the original sheet until switching to the second signal from the first signal is determined on the basis of the number of steps of the ADF motor 37 (an example of a first predetermined rotation amount according to the present invention). If the distance of conveyance of the original sheet determined on the basis of the number of steps is less than the distance 92 (that is, the distance between the conveying roller 61 and the pinch roller 62; see FIG. 8), this, basically, means that, after the front edge of the original sheet has passed the third sensor 43, the back edge of the original sheet has moved away from the conveying roller 61 before reaching the pinch roller 62. That is, this means that the length of the original sheet is very short, and that the original sheet stops at the imaginary area 98.

Subsequent to the Step S7, after the front edge of the original sheet has entered the first conveying path 26, the ADF motor 37 is further rotated, and the original sheet is conveyed in the conveying direction by a predetermined amount along the first conveying path 26 (Step S8). The predetermined amount is determined on the basis of the number of steps of the ADF motor 37. Thereafter, the image sensor 24 operates while the original sheet is conveyed, and the image that has been recorded on the back surface of the original sheet is scanned (Step S9).

The original sheet passing the first conveying path 26 is eventually nipped by the main roller 64 and the pinch roller 62, and enters the curved conveying path 27. The original sheet that is conveyed along the curved conveying path 27 is nipped by the main roller 64 and the pinch roller 63, and is conveyed from the curved conveying path 27 to the second conveying path 28.

When the original sheet passes the curved conveying path 27, the fourth sensor 44 is turned on (Step S10). When the state of the fourth sensor 44 is changed from the off state to the on state, a signal that the fourth sensor 44 outputs (an example of a fourth signal according to the present invention) indicates that the original sheet exists at the curved conveying path 26, that is, the original sheet is nipped by the main roller 64 and the pinch roller 63. When the state of the fourth sensor 44 is changed from the on state to the off state, the fourth signal that the fourth sensor 44 outputs ceases to exist, thereby indicating that the original sheet is not nipped by the main roller 64 and the pinch roller 63. At this time, the CPU 101 of the controlling section 100 determines that the fourth sensor 44 has output a third signal (an example of a third signal according to the present invention).

Here, when the state of the third sensor 43 is changed from the on state to the off state (the second signal is output), and the fourth sensor 44 detects that the original sheet does not exist (the third signal is output), this essentially means that the original sheet enters the curved conveying path 27 through the first conveying path 26, and that the front edge of the original sheet is not nipped by the main roller 64 and the pinch roller 63. That is, this means that the length of the original sheet is less than the distance A and that the original sheet stops at the second conveying path 28.

When, with the third sensor 43 changing its state from the off state to the on state (the first signal is output), the state of the fourth sensor 44 is changed from the off state to the on state (the fourth signal is output), this means that the original sheet exists at the first conveying path 26 and the curved conveying path 27, and is nipped by the conveying roller 61 and the pinch roller 63. In this case, the distance of conveyance of the original sheet until the state of the third sensor 43 is changed again from the on state to the off state is determined on the basis of the number of steps of the ADF motor 37 (an example of a second predetermined rotation amount according to the present invention). If the distance of conveyance of the original sheet determined on the basis of the number of steps is less than the distance difference D between the distance A and the distance B (that is, the distance between the pinch roller 63 and the discharge roller 72), this, basically, means that the length of the original sheet is less than the distance B, and that the original sheet stops at the second conveying path 28.

On the basis of the signals that the third sensor 43 and the fourth sensor 44 output, the length of the original sheet is detected (Step S11). That is, the CPU 101 of the controlling section 100 obtains the signals that the third sensor 43 and the fourth sensor 44 output and the number of steps of the ADF motor 37 (Step S12; see FIG. 12).

It is determined whether or not the length of the original sheet is greater than the distance A (Step S13). If the length of the original sheet is less than the distance A ("N" in Step S13), the conveyance of the original sheet is stopped (Step S14). That is, the ADF motor 37 is stopped, and the operation panel 40 (see FIG. 1) performs an error display (Step S15). In this case, when the length of the original sheet is less than the distance 92 (see FIG. 8), the original sheet stops at the imaginary area 98. The user can take out the original sheet by opening the upper cover 32. When the length of the original sheet is greater than the distance 92 and less than the distance A, the original sheet stops at the curved conveying path 27 and the first conveying path 26 while being nipped by the main roller 64 and the pinch roller 62. The user can pull out the original sheet from the curved conveying path 27 by opening the upper cover 32.

If the length of the original sheet is greater than the distance A ("Y" in Step S13), a determination is subsequently made as to whether the length of the original sheet is greater than the distance B (Step S16). If the length of the original sheet is less than the distance B ("N" in Step S16), the original sheet is further conveyed in the conveying direction by a distance C (Step S17). The distance C is determined on the basis of the number of steps of the ADF motor 37, and is in correspondence with a predetermined rotation amount of the pinch roller 63. The number of steps corresponding to the distance C is preset, and is stored in ROM 102 of the controlling section 100. Although the magnitude of the distance C is not particularly limited, it is desirable that the distance C be greater than the sum of the distance difference D and the distance A, and smaller than the distance B.

When the original sheet is conveyed by the aforementioned distance C, the original sheet passes the pinch roller 63. Thereafter, the conveyance of the original sheet is stopped (Step S18), and the operation panel 40 (see FIG. 1) performs an error display (Step S19). In this case, the original sheet stops at the second conveying path 28. However, since the opening 84 is provided at the lower surface of the ADF 11 (see FIG. 2), the user can easily take out the original sheet from the opening 84.

If the length of the original sheet is greater than the distance B, the original sheet is nipped as it is by the main roller 64 and the pinch roller 63, and is conveyed by a predetermined amount in the conveying direction (Step S20, see FIG. 11). While the original sheet is being conveyed, the original sheet passes the image sensor 24, and the image reading operation by the image sensor 24 ends (Step S21).

The front and back surfaces of the original sheet are reversed when the original sheet passes along the curved conveying path 27. After the image reading operation of the back surface by the image sensor 24 ends, an image that has been recorded on the front surface of the original sheet is read (Step S22; see FIG. 10).

Figure 13:
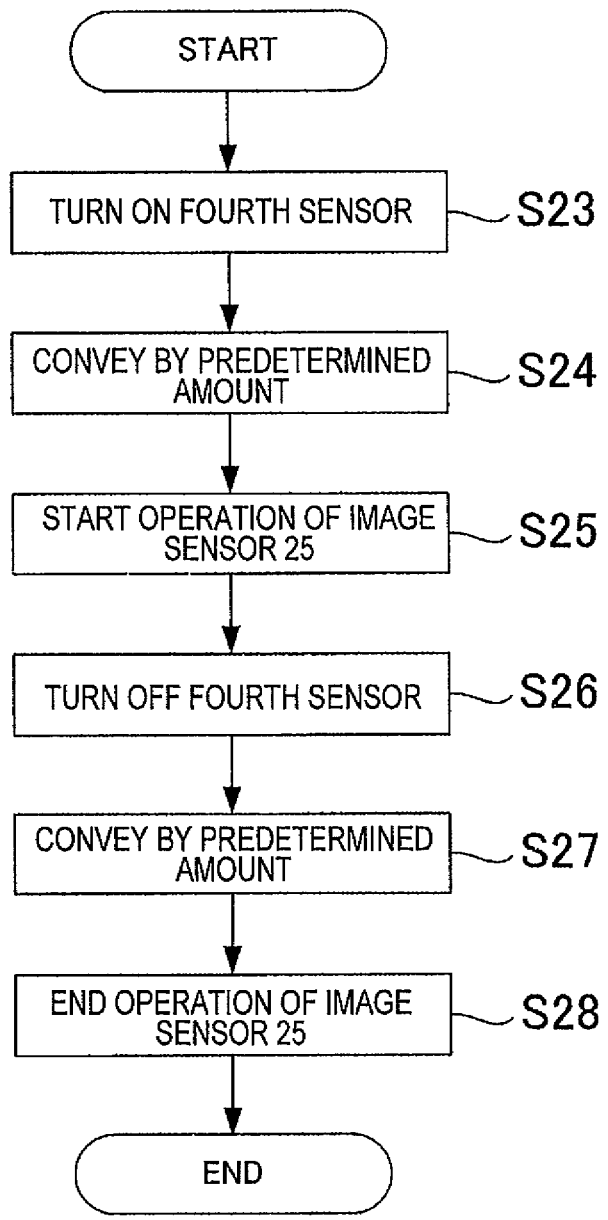
FIG. 13 is a flowchart of the outline for conveying the original sheet by the image processing apparatus according to the embodiment of the present invention.

When the recording sheet reaches the fourth sensor 44, the fourth signal is output as mentioned above (Step S23; see FIG. 13). As shown in FIG. 13, the original sheet is conveyed by a predetermined amount on the basis of the fourth signal (Step S24). The amount of conveyance of the original sheet is also known on the basis of the number of steps of the ADF motor 37. After the original sheet is conveyed by the predetermined amount, the image sensor 25 operates (Step S25). The original sheet is conveyed as it is, and the image that has been recorded on the front surface of the original sheet is scanned by the image sensor 25. When the original sheet is conveyed and the back edge of the original sheet passes the fourth sensor 44, the fourth sensor 44 outputs the third signal (Step S26). By this, it is known that the original sheet has passed a nip point of the pinch roller 63. After the original sheet passes the nip point, the original sheet is conveyed as it is by a predetermined amount (Step S27). While the original sheet is being conveyed, the operation of the image sensor 25 is stopped (Step S28), so that the images recorded on both surfaces of the original sheet are read.

After the image reading operations of the original sheet end, a determination is made as to whether or not an original sheet following the present original sheet exists. More specifically, a determination is made as to whether or not the first sensor 41 (see FIG. 7) is turned on (Step S29; see FIG. 10). If a following original sheet does not exist ("Y" in Step S29), the present original sheet is discharged (Step S30). Since the length of the present original sheet is greater than the distance B, in a state in which the images of the present original sheet have been read, the discharge roller 72 nips the original sheet. Therefore, by driving the ADF motor 37, the original sheet is discharged to the sheet-discharge tray 14. If a following original sheet exists ("N" in Step S29), the ADF motor 37 is rotationally driven in the reverse direction, and, similarly to the above, the following original sheet is supplied from the sheet-feed unit 50 (Step S2). The outline of the subsequent steps for conveying the following original sheet is similar to that mentioned above.

According to the image processing apparatus 10 according to the embodiment, when there is a possibility that an original sheet may be stopped because the length of the original sheet is too short, the ADF motor 37 is immediately stopped. Therefore, the user can quickly know that an error has occurred and quickly take out the original sheet. If there is a possibility that the original sheet may stop at the second conveying path 28, the ADF motor 37 is stopped after the original sheet has been conveyed to a position where the user can easily take out the original sheet. Therefore, if the image processing apparatus 10 requires a jamming prevention operation because the original sheet is short, the ADF motor 37 is stopped in a short time.

Accordingly, due to the demand for a compact design from the past, the image processing apparatus according to the embodiment has a structure that includes the U-turn conveying path 16 and in which the pinch roller 63 is incapable of being subjected to an unnipping operation at the curved conveying path 27. Even if the image processing apparatus has such a structure, it can quickly perform a jamming prevention operation and contribute to saving electric power by restricting unnecessary operations of the ADP motor 37.

What is claimed is:

1. An image processing apparatus capable of reading an image recorded on a first surface and a second surface of a sheet, the image processing apparatus comprising:
    a U-turn conveying path comprising:
        a first conveying path formed in a substantially plate shape;
        a second conveying path disposed below the first conveying path; and
        a curved conveying path disposed between the first conveying path and the second conveying path,
    an upper cover configured to rotate between a closed position where the first conveying path is partly covered and an open position where the first conveying path is exposed, wherein at least the first conveying path is exposed when the upper cover is in the open position;
    a first image reading section disposed below the first conveying path and configured to read the image recorded on the first surface of the sheet conveyed along the first conveying path;
    a second image reading section disposed below the second conveying path and configured to read the image recorded on the second surface of the sheet conveyed along the second conveying path;
    a first conveying roller positioned upstream of the first conveying path in a conveying direction and configured to nip and convey the sheet to the first conveying path;
    a second conveying roller positioned at a boundary between the first conveying path and the curved conveying path and configured to nip and convey the sheet to the curved conveying path, wherein the second conveying roller unnips the sheet when the upper cover is in the open position;
    a third conveying roller positioned downstream of the curved conveying path in the conveying direction and configured to nip and convey the sheet to the second conveying roller;
    a fourth conveying roller positioned downstream of the second conveying path in the conveying direction and configured to discharge the sheet from the second conveying path; and
    a control unit configured to control to stop conveying the sheet when a back edge of the sheet passes the first conveying roller in the case where a length of the sheet in the conveying direction is less than a first distance between the first conveying roller and the third conveying roller along the conveying direction and to stop conveying the sheet after conveying the sheet in the conveying direction until the back edge of the sheet passes the third conveying roller in the case where the length of the sheet in the conveying direction is greater than the first distance and is less than a second distance between the third conveying roller and the fourth conveying roller along the conveying direction.

2. The image processing apparatus according to claim 1, further comprising:
    a rotation amount detector for detecting an amount of rotation of the first conveying roller;
    a first sheet detector, disposed downstream of the first conveying roller in the conveying direction, for detecting that a sheet exists; and
    a second sheet detector, disposed downstream of the third conveying roller in the conveying direction, for detecting that a sheet exists,
    wherein the control unit immediately stops the second conveying roller when the first sheet detector outputs a second signal indicating that a sheet does not exist before the rotation amount detector detects a first predetermined rotation amount of the first conveying roller after the first sheet detector outputs a first signal indicating that a sheet exists, and when the second sheet detector outputs a third signal indicating that a sheet does not exist in the case where the first sheet detector is changed from a state in which the first sheet detector outputs the first signal to a state in which the first sheet detector outputs the second signal; and
    wherein the control unit stops the third conveying roller after rotating the third conveying roller by a predetermined rotation amount when the first sheet detector outputs the first signal and the second sheet detector is changed from a state in which the second sheet detector outputs the third signal to a state in which the second sheet detector outputs a fourth signal indicating that a sheet exists, and when the first sheet detector is changed from the state in which the first sheet detector outputs the first signal to the state in which the first sheet detector outputs the second signal before the rotation amount detector detects a second predetermined rotation amount of the first conveying roller after the second sheet detector is changed from the state in which the second sheet detector outputs the third signal to the state in which the second sheet detector outputs the fourth signal.

3. The image processing apparatus according to claim 2,
wherein the second predetermined rotation amount of the first conveying roller corresponds to a distance difference D between the second distance and the first distance, and
wherein the predetermined rotation amount of the third conveying roller is greater than a distance equal to the sum of the first distance and the distance difference D and that is less than the second distance.

4. The image processing apparatus according to claim 1,
wherein an end portion downstream of the curved conveying path in the conveying direction is provided with an opening where the sheet moving from the curved conveying path to the second conveying path is exposed.

* * * * *